US008086671B2

(12) United States Patent (10) Patent No.: US 8,086,671 B2
Helland et al. (45) Date of Patent: Dec. 27, 2011

(54) SYSTEMS AND METHODS THAT FACILITATE IN-ORDER SERIAL PROCESSING OF RELATED MESSAGES

(75) Inventors: Patrick J. Helland, Bellevue, WA (US); Gerald L. Hinson, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1735 days.

(21) Appl. No.: 10/776,841

(22) Filed: Feb. 11, 2004

(65) Prior Publication Data

US 2005/0198127 A1 Sep. 8, 2005

(51) Int. Cl.
*G06F 15/16* (2006.01)
(52) U.S. Cl. ........ 709/204; 709/206; 709/203; 709/226; 707/687; 707/737; 707/738; 707/740; 707/704
(58) Field of Classification Search .......... 709/204–207; 707/8, 703, 704, 687, 737, 738, 999.008, 707/740
See application file for complete search history.

(56) References Cited

U.S. PATENT DOCUMENTS

| | | | | |
|---|---|---|---|---|
| 5,226,143 A | * | 7/1993 | Baird et al. | 711/145 |
| 5,287,444 A | | 2/1994 | Enescu et al. | |
| 6,026,401 A | * | 2/2000 | Brealey et al. | 707/8 |
| 6,167,402 A | * | 12/2000 | Yeager | 1/1 |
| 6,205,471 B1 | | 3/2001 | Gilchrist et al. | |
| 6,226,641 B1 | * | 5/2001 | Hickson et al. | 1/1 |
| 6,338,081 B1 | | 1/2002 | Furusawa et al. | |
| 6,484,196 B1 | * | 11/2002 | Maurille | 709/206 |
| 6,571,275 B1 | | 5/2003 | Dong et al. | |
| 6,772,153 B1 | * | 8/2004 | Bacon et al. | 707/8 |
| 6,988,099 B2 | * | 1/2006 | Wiser et al. | 707/8 |
| 7,089,278 B1 | * | 8/2006 | Churchill et al. | 709/203 |
| 7,213,047 B2 | * | 5/2007 | Yeager et al. | 709/202 |
| 7,321,969 B2 | * | 1/2008 | Schoen et al. | 713/153 |
| 7,451,444 B2 | * | 11/2008 | Carney | 718/100 |
| 2003/0212818 A1 | * | 11/2003 | Klein et al. | 709/238 |

OTHER PUBLICATIONS

Stephen Pollock. A Rule-based Message Filtering System. ACM Transactions on Information Systems, vol. 6 Issue 3, pp. 232-254, 1988.
S. Berchtold, A. Biliris, and E. Panagos. SaveMe: a System for Archiving Electronic Documents using Messaging Groupware. Proceedings of the International joint Conference on Work Activities and Coordination and Collaboration, pp. 167-176, 1999.

* cited by examiner

*Primary Examiner* — Carl Colin
*Assistant Examiner* — Mohammad Siddiqi
(74) *Attorney, Agent, or Firm* — Workman Nydegger (57) ABSTRACT

The present invention relates to systems and methods that facilitate serial access to related messages stored within a queue. The systems and methods comprise a conversation manager that generates conversation groups and associated conversation group identifiers for related messages, wherein related messages are associated with one or more dialog conversations between services. The conversation manager utilizes a respective conversation group identifier to lock a conversation group and provide exclusive serial access to the related messages therein and any related incoming messages to a reader such that only one reader at a time can access and process the related messages; other readers can still concurrently dequeue and process messages associated with other conversation groups. The present invention employs order queuing techniques that ensure messages are stored in-order, which facilitates in-order serial processing of messages in a conversation group.

10 Claims, 10 Drawing Sheets

SYSTEMS AND METHODS THAT FACILITATE IN-ORDER SERIAL PROCESSING OF RELATED MESSAGES

TECHNICAL FIELD

The present invention generally relates to message processing, and more particularly to systems and methods that associate, lock and provide exclusive access to related messages for in order processing.

BACKGROUND OF THE INVENTION

A typical messaging system comprises one or more messaging services that post messages associated with one or more transactions, and one or more readers that process the transactions via processing respective messages. In some instances, a transaction can be associated with one message, wherein processing the message completes the transaction. In other instances, a transaction can comprise a plurality of messages that require processing in order to complete the transaction. In addition, the plurality of messages can be posted by one or more disparate messaging services, and one or more readers may be available to process one or more of the plurality of messages.

One obstacle associated with such messaging systems is coordinating parallel message reads from the same queue by multiple readers in order to mitigate deadlock. By way of example, a first reader can lock communication with a first messaging service in order to retrieve and process one or more messages posted by the first messaging service. To complete the associated transaction, the first reader may be required to retrieve and process one or more messages posted by a second messaging service. If the second messaging service is concurrently locked by a disparate reader, the first reader will not be able to access and process the one or more messages posted by the second messaging service. Moreover, the disparate reader may be required to retrieve and process one or more messages posted by the first messaging service. Since both readers are waiting to lock the messaging service locked by the other, a deadlock situation occurs and neither reader completes respective transactions.

Another obstacle associated with messaging systems is mitigating processing messages out-of-order. When multiple readers or multiple threads read from the same queue, messages can be processed out-of-order. By way of example, a first message comprising one or more instructions for creating a transaction header and a second message comprising one or more instructions for creating transaction line items can be stored in a queue. In many instances, the transaction header message must be processed first to instantiate the transaction. However, when messages are dequeued and processed, the transaction line item message may be dequeued first, wherein an attempt to commit the transaction line item fails because the transaction does not exist yet. Such failures can cause the transaction to roll back and the message to be requeued and processed again, which can lead to inefficient utilization of resources.

Many conventional messaging products today can ensure in-order delivery of messages; however, these products typically do not provide support for serializing in-order message processing in a manner that prevents parallel queue readers from simultaneously dequeuing and attempting to process messages associated with the same transaction. Instead, the burden of coordinating queue reads by multiple queue readers is left to the application developer. Implementing such work around routines in the application layer can be difficult, and often impossible to accomplish without reducing system performance.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides systems and methods that facilitate in-order serial processing of related messages by a single reader via a conversation group locking technique. The systems and methods provide a conversation manager that can generate a conversation group and a corresponding conversation group unique identifier and associate related dialogs (messages) with the identifier. In general, a conversation group comprises one or more related dialogs, wherein a dialog comprises one or more messages exchanged between services. The conversation group unique identifier can be utilized to lock the conversation group and related messages and provide exclusive access to the related messages such that only one reader can process related messages at any given time. Other readers can dequeue and process other messages related to other conversation groups. Thus, the present invention enables multiple readers to reliably and efficiently process messages in parallel.

The present invention employs various order queuing techniques, wherein messages are stored in-order, which ensures that related messages associated with a conversation group can be are serially processed in-order. For example, when a message body is received prior to or concurrently with a message header, the message body can be temporarily set aside (or dropped) until the message header arrives and is stored. The foregoing ensures that a reader is provided with access to serially process the messages.

Conventional systems that provide in-order delivery of messages do not ensure serial in-order consumption of related messages and do not utilize conversation locking to prevent conflicts between parallel queue readers, such as simultaneously dequeuing related messages. Instead, conventional systems leave the burden of coordinating reads from multiple queue readers to the application developer. The subject invention mitigates this burden.

In one aspect of the present invention, a system is provided that facilitates message processing via conversation group locking. The system comprises a component that receives requests for messages and a conversation group manager that locks requested messages and related messages by locking an associated conversation group. Such locking is typically achieved by locking a corresponding conversation group identifier, wherein the lock provides the requestor exclusive access to the related messages so that the requester can process at least a portion of the related messages. Incoming related messages can be associated with the locked conversation group and the requestor can access and process the newly arrived related messages.

In another aspect of the present invention, a system that facilitates conversation group locking and serial message processing is illustrated. The system comprises a group management component that associates related messages with a conversation group. In general, properties such as identities of delivered message are utilized to determine whether a message is related to at least one other message. If the message is not related to any other message, a conversation group and an associated identifier is generated for the message. If at least one other message is related to the message, then a conversation group and an associated identifier is generated for the set of related messages. The system further comprises a component that facilitates in-order storage of messages to facilitate in-order serial processing of the related messages. The system further comprises an access management component that locks and unlocks conversation groups via respective identifiers.

In yet another aspect of the present invention, a system is illustrated that employs conversation group locking to facilitate serial access to application data. The system employs an API that can be utilized by an application developer to associate an application with a conversation group identifier. When a user launches the application, the conversation group identifier can be automatically locked, which locks the application data. The user can access the application data and the application can modify and/or add data, but other users are prevented from concurrent access (e.g., locked out). In addition, the application data can be stored in-order to provide for serial access to the application data by the user.

In other aspects of the present invention, methodologies that facilitate conversation group locking are provided. Such methodologies include receiving messages and requests to process messages, storing messages in-order, locating related messages, associating related messages with a conversation group, locking a conversation group with a conversation group identifier, and providing exclusive access to the conversation group for serial processing.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention provides systems and methods that facilitate message processing via conversation locking. The systems and methods comprise a conversation manager that can generate a conversation group and a conversation group unique identifier and associate related dialogs with the identifier. This conversation group identifier can be utilized to lock the conversation group and provide exclusive serial access to the related messages therein and related incoming messages, such that only one service can process related messages at any given time. However, other messaging services can dequeue and process other messages associated with other conversation groups, which enables multiple services to reliably and efficiently dequeue and process messages in parallel. In addition, the present invention employs queuing techniques that ensure messages stored in-order can be processed in-order.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be an entity (e.g., within a process) that an operating system kernel schedules for execution. Moreover, a component can be associated with a context (e.g., the contents within system registers), which can be volatile and/or non-volatile data associated with the execution of the thread.

Figure 1:
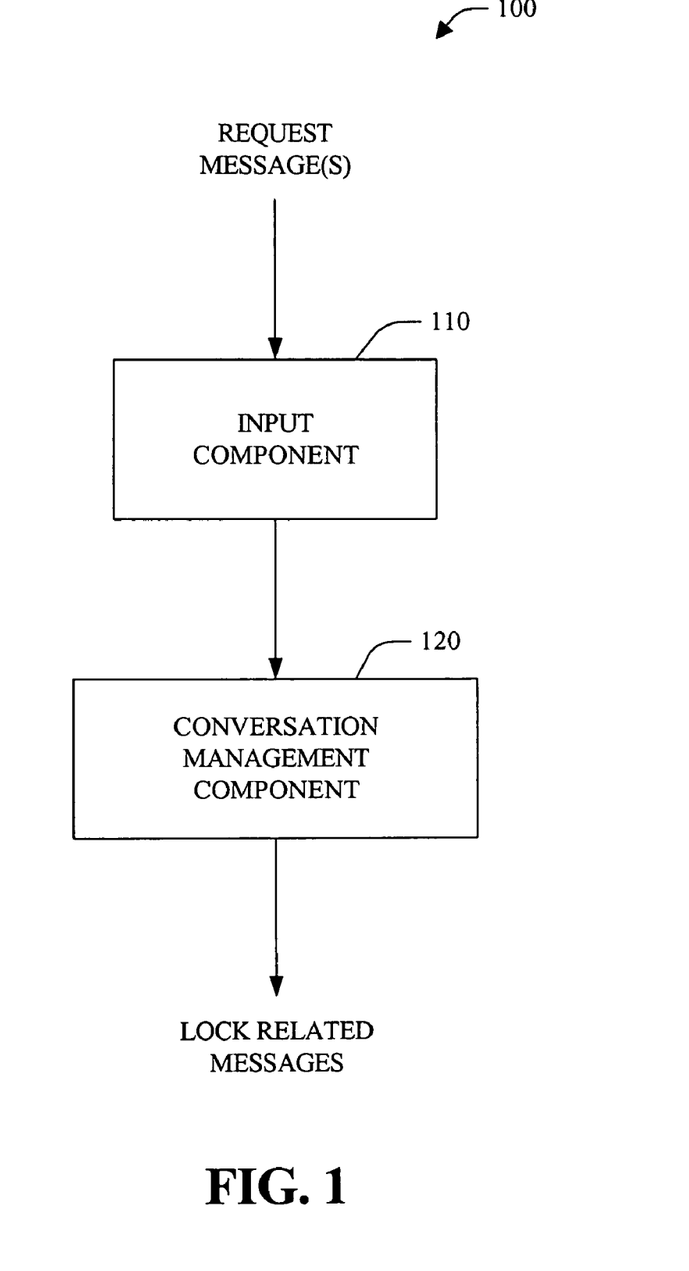
FIG. 1 illustrates an exemplary system that facilitates message processing via conversation group locking.

FIG. 1 illustrates a system 100 that facilitates message processing via conversation locking. The system 100 comprises an input component 110 that receives requests for messages and a conversation management component 120 that locks requested messages and related messages and provides access to these locked messages to a requesting service. In general, the system 100 can be employed in an environment wherein one or more readers can obtain and process one or more messages from one or more clients. Conventionally, such an environment can be problematic when multiple readers attempt to process messages from a similar queue. For example, a first reader can lock and attempt to process a first message, wherein processing the first messages includes processing a second message that is locked by a second reader. Such situations can result in "deadlock." In another example, conventional systems typically do not support serializing consumption of related messages in a queue such that multiple readers are prevented from simultaneously dequeuing messages from a related message set. Instead, conventional systems pass this burden to the application developer.

The system 100 mitigates the foregoing obstacles. In general, a reader request for a message can be received by the input component 110, which subsequently conveys the request to the conversation management component 120. Such conveyance can be through transmission by the input component 110 and/or retrieval by the conversation management component 120. It is to be appreciated that the input component 110 can be essentially any interface that can provide a communication between a reader and the conversation management component 120.

The conversation management component 120 can employ the request and/or information (e.g., metadata) related to the request to locate related messages in a queue. For example, the request can include information such as an identifier and/or descriptor. Such information, in conjunction with similar information stored in connection with messages already in the queue, can be utilized to associate messages. In one aspect of the present invention, a group of related, or associated messages can be linked by a group identifier.

The conversation management component 120 can utilize this identifier to lock the group of related messages and provide access to the locked grouped by the reader that issued the request. The lock can prevent other readers from accessing the messages associated with the locked conversation group. However, other readers can lock other unlocked conversation groups and associated messages. It is to be appreciated the conversation management component 120 can provide access to multiple readers; however, access is typically limited to one reader in order to mitigate, inter alia, "deadlock" and relieve the application developer of any reader coordination burden. When the reader finishes processing messages (e.g., after a subset or all the messages have been processed), the reader notifies the conversation management component 120 to release the lock and the conversation management component 120 releases the lock It is to be appreciated that an incoming related message (e.g., a messages posted by a client) can be added to a locked group for access by a reader. Similar to above, the incoming message can include information (including a designation of a specific conversation group) that can be utilized to determine message relationships. In addition, it is to be appreciated that related messages within a conversation group can be ordered to mitigate out-of-order processing, as described in detail below.

Figure 2:
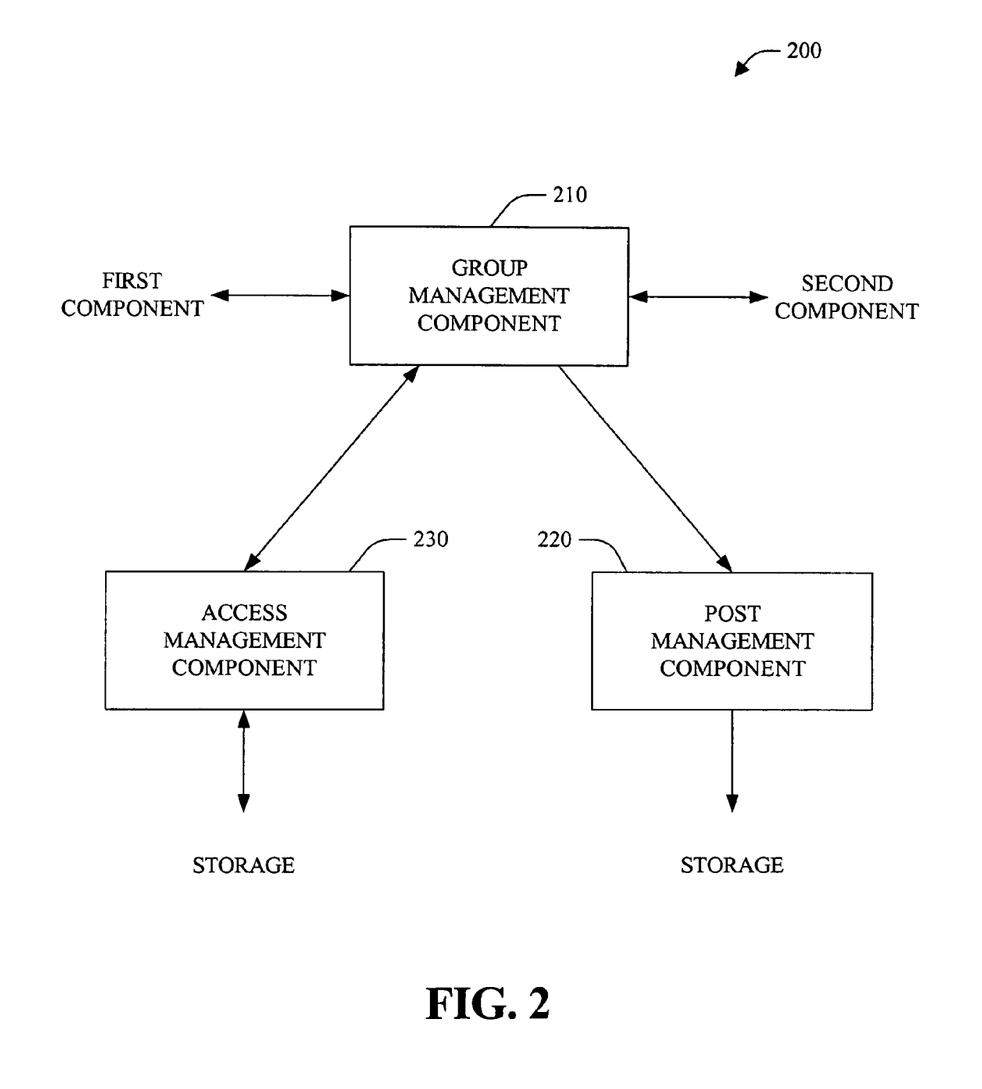
FIG. 2 illustrates an exemplary system that facilitates conversation group locking between components and provides serial processing of related messages.

FIG. 2 illustrates a system 200 that facilitates conversation group locking and serially processing of related messages. The system 200 comprises a group management component 210 that associates related messages with a conversation group, a post management component 220 that coordinates storage of incoming messages and an access management component 230 that provides access to the conversation group. As noted above, a conversation group can comprise one or more related dialogs, wherein a dialog can comprise one or more messages.

The group management component 210 manages conversations between components. Such management can include opening conversations, tracking conversations, and tracking messages within one or more conversations, for example. It is noted that essentially any two components can serially and/or concurrently engage in conversations, and the two components can engage in concurrent conversations. In addition, such conversations can be related or unrelated, wherein one or more messages from respective conversations can be related and/or unrelated. Moreover, components can deliver and/or process messages concurrently in a full duplex manner.

Upon delivery of a message, the group management component 210 can facilitate associating an identifier with the message and associating the message with one or more related messages in a conversation group. These associations can be rendered in connection with information pertaining to respective messages. For example a message can be delivered with a message identifier that can be utilized to associate the message with related messages and/or a conversation group. In various aspects of the invention, the group management component 210 can override such information, provide identifier information upon request and/or generate identifiers when a received message does include such information. In other aspects of the present invention, message identifiers and associations are determined upon a request to process a message rather than when a message is delivered.

Delivered messages are conveyed to the post management component 220, which facilitate storing messages. The post management component 220 can ensure that messages are stored in-order (e.g., in the order that the messages need to be processed), as described in detail below. Such storage facilitates serial message processing, which can mitigate transaction roll back or failure due to out-of-order processing.

As noted above, as dialogs are established and messages are delivered to the system 200, the messages can be serially processed. In general, a component can request access to one or more messages and/or a conversation group. The request can include one or more message identifiers and/or a conversation group identifier. When the request is for one or more messages, the group management component 210 can locate related messages and/or locate or generate an associated conversation group. When the request includes a message identifier, the group management component 210 can utilize this information to facilitate locating related messages and/or locating or generating an associated conversation group. When the request includes a conversation group identifier, the group management component 210 can utilize this information to facilitate locating the conversation group, if it exists, or generating a new conversation group.

Upon obtaining a conversation group identifier, the access management component 230 can lock the conversation group via the identifier and provide access to the conversation group and related messages by the requesting component. It is to be appreciated that related dialogs can be established while a conversation group is locked and related messages can arrive while messages are processed. Messages delivered during these circumstances can be seamlessly associated with the locked conversation group and serially processed.

Other messaging service components can concurrently open dialogs unrelated to the locked conversation group and deliver messages unrelated to the locked conversation group. In addition, other components can request access to these unrelated messages and dialogs associated with other conversation groups. Similarly, respective conversation groups can be located and/or generated and locked, wherein associated related messages can be processed. It is to be appreciated that access to a single conversation group is limited to a single processing component, but multiple components can engage in dialog with the processing component and deliver messages for processing. The foregoing enables multiple readers to reliably and efficiently process related messages in parallel.

The access management component 230 can release the lock on a conversation group when the component is finished processing messages. It is to be appreciated that the component can process all or a subset of the related messages and release the lock. Where a lock is released and messages remain for processing, the same or a different component can request the lock and serially process any remaining messages or subset thereof.

Figure 3:
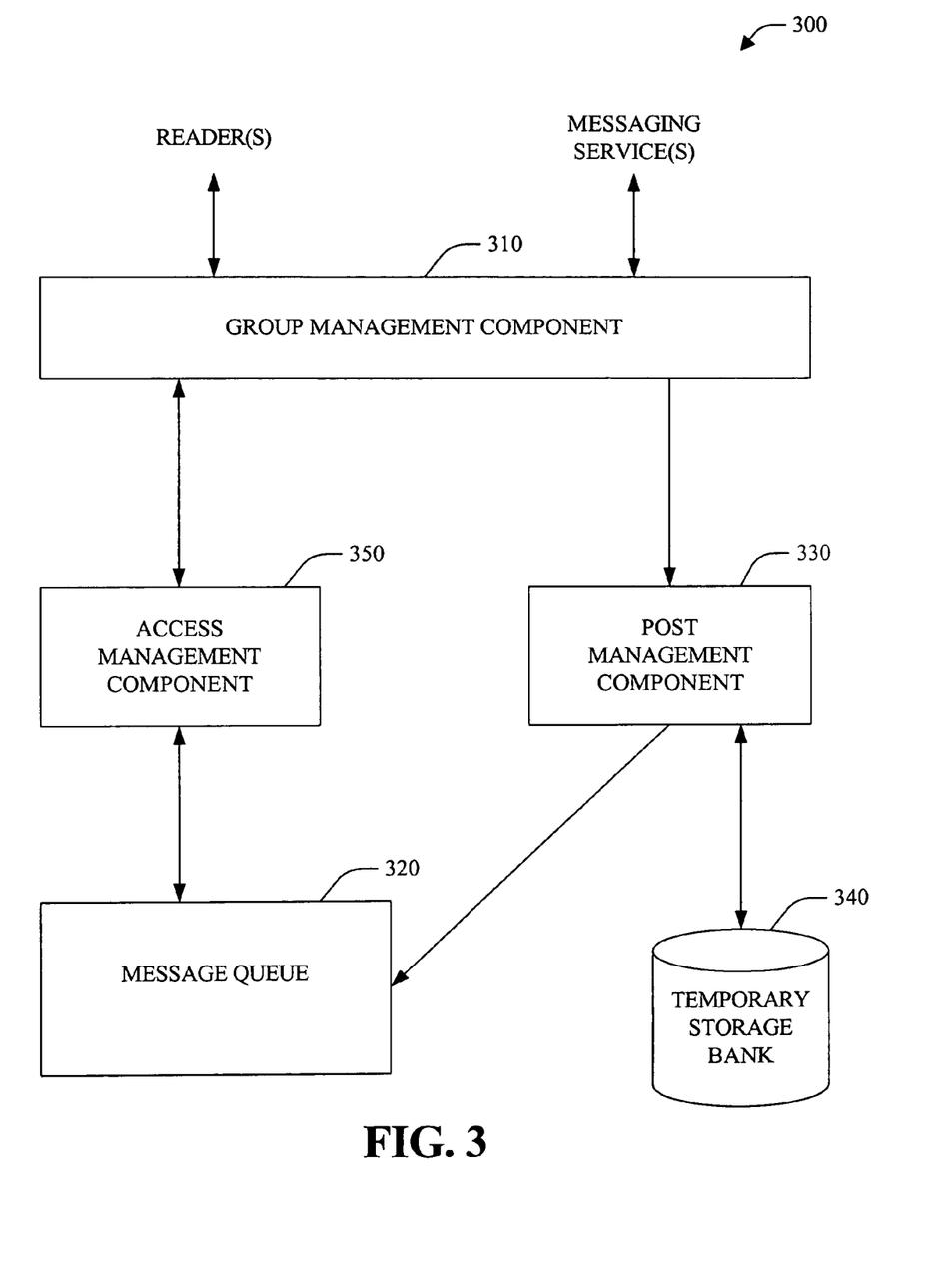
FIG. 3 illustrates an exemplary system that facilitates conversation group locking.

FIG. 3 illustrates a system 300 that facilitates conversation group locking. The system 300 comprises a group management component 310, a message queue 320, a post management component 330, a temporary storage bank 340, and an access management component 350.

In general, one or more dialogs can be established between one or more readers and one or more messaging services, wherein the one or more messaging services can transmit messages that are processed by the one or more readers. In addition, the one or more readers can submit messages to the one or more messaging services, for example, to request additional information. Transmitted messages can be received by the group management component 310, wherein the messages are saved to the message queue 320 and/or directly conveyed for processing. It is to be appreciated that the one or more messaging services can concurrently and/or serially transmit and/or receive messages and the one or more readers can concurrently and/or serially transmit and/or receive messages.

As noted previously, incoming messages can include information such as message identifiers that can be utilized to associate messages with related messages and/or a conversation group identifier. In addition, the group management component 310 can override these identifiers, provide identifiers upon request and/or generate identifiers when a delivered message includes an identifier.

Incoming messages can be conveyed to the post management component 330 and stored in the message queue 320. The post management component 330 can ensure in-order storage of incoming messages in the message queue 320 to provide for serial message processing. In many instances, messages are delivered in-order, even when more than one messaging service provides messages for a similar task. However, in other instances, the messages can be received out-of-order. Such out-of-order processing can result in transaction roll back and retry or failure. Traditional attempts to mitigate out-of-order message processing include combining related messages, but this can be cumbersome for a small number of messages and unworkable for a large number of messages.

The post management component 330 can mitigate out-of-order storage and processing by temporarily storing out-of-order messages in the temporary storage bank 340 until respective messages become in-order, at which time they can be saved in-order to the message queue 320. In other aspects of the present invention, out-of-order messages are simply discarded, wherein the associated messaging service can be notified (e.g., via an interrupt, an event, and a time-out) to resend the message. In yet another aspect of the present invention, the message can be returned to the associated messaging service, which elicits a resend, for example, after a time lapse or indication that the message can be delivered in-order.

The one or more readers can concurrently retrieve and process messages while the one or more messaging services deliver messages. Thus, the present invention supports full duplex and parallel communication. In general, a reader can request access to one or more messages and/or a conversation group in order to process related messages. The request can include one or more messages, one or more message identifiers and/or a conversation group identifier. Upon locating related messages and/or determining a conversation group, the access management component 350 can lock the conversation group, wherein access to the conversation group can be limited to the requesting reader. Additional related messages can be delivered after a conversation group is locked and messages are processed, wherein the messages are seamlessly associated with a conversation group and processed.

The access management component 350 can release the lock when the reader is finished processing messages. It is to be appreciated that such finishing can include processing all or a subset of the messages associated with a conversation group. Where a subset is processed, the same or a different reader can request the lock to process any remaining messages or a subset thereof. In addition, it is to be appreciated that other readers can concurrently request access to messages associated with other conversation groups. It is to be appreciated that access to a conversation group is limited to a single reader and related messages are processed serially in-order. The foregoing enables multiple readers to reliably and efficiently process related messages in parallel.

Figure 4:
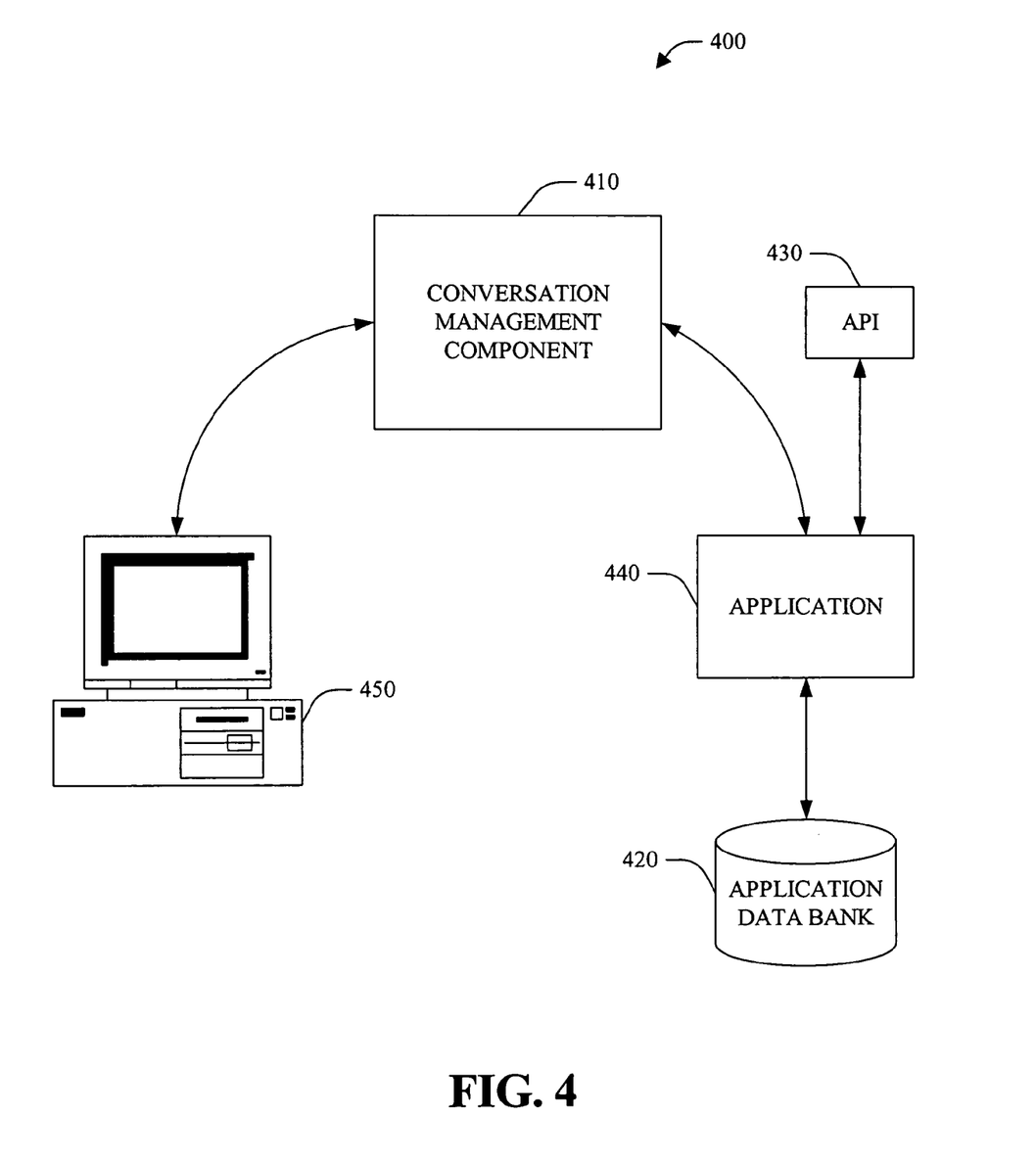
FIG. 4 illustrates an exemplary system that employs conversation group locking to facilitate serial access to application data.

FIG. 4 illustrates a system 400 that employs conversation group locking to facilitate serial access to application data. The system 400 comprises a conversation management component 410 that generates conversation groups, an application data bank 420, an application program interface (API) 430, an application 440, and a machine 450. The conversation management component 410 can assign identifiers to messages and/or conversation groups, locate related messages via message identifiers, and associate related messages with a conversation group. In addition, the conversation management component 410 can utilize a conversation group identifier to lock a conversation group and, thus, the associated related messages. The foregoing enables a reader to obtain exclusive access to related messages in order to process the related messages. This exclusive access prohibits other readers from concurrently processing the same message, which can lead to transaction roll back, for example. With conventional systems, competing access is typically handled by the application developer through custom application code. The present invention's novel locking technique mitigates need for such custom application code.

Furthermore, the present invention utilizes techniques to ensure serial access to messages. Typically, messages are delivered and saved in-order. However, messages can be received out-of-order, wherein they are saved in-order for serial processing. For example, an out-of-order message can be saved to temporary storage until it becomes in-order or the message can be dropped and resent, as necessary, until it becomes in-order. Moreover, a locked conversation group can comprise one or more dialogs with one or more messages in respective dialogs. In addition, related messages can be added to a locked conversation group as they arrive. Thus, the number of dialogs and messages within a conversation group is dynamic and messages can be processed and stored concurrently.

An application developer can utilize the conversation management component 410 to facilitate providing serial access to application data stored within the application data bank 420. In one aspect of the present invention, the developer employs the API 430 to associate the application 440 with a conversation group generated by the conversation management component 410. For example, the application developer can associate application state and/or data with a conversation group identifier. This association can include a mechanism that will lock the conversation group identifier prior to allowing access to the application data bank 420 by the machine 450. Thus, when the machine 450 attempts to access application data from the application data bank 420 via the conversation management component 410, the conversation group can be automatically locked, which locks the application data in the application data bank 420. The machine 450 can be given access to the data, wherein the lock prevents other machines (not shown) from obtaining access to the application data.

The lock provides exclusive access to the application data in the application data bank 420; however, the lock does not prevent the application 440 from writing further data to the application data bank 420. In addition, as the application 440 updates the application data bank 420 with data, the data can be associated with the locked conversation group, which provides the machine 430 with access to it. The data is typically delivered and stored in the application data bank 420 in an in-order manner. However, when the data is delivered out-of-order, the conversation management group 410 can facilitate storing the data in-order, if desired, in order to provide for serial data processing.

The machine 450, in connection with the conversation management component 410, can release the lock on the conversation group and, thus, the application data stored in the application bank 420. Once released, another machine (not shown) can request access to the application data stored in the application data bank 420 and the conversation management component 410 can lock the associated conversation group and provide access to the requesting machine.

It is to be appreciated that more than one application can be associated with a conversation group. Thus, the machine 450 can transmit a request that can invoke the conversation management component 410 to lock one or more data banks associated with the one or more applications. While the conversation group is locked, only the requesting machine will have access to the one or more data banks. The foregoing ensures exclusive data access when multiple applications concurrently execute and read and/or write to each other's data bank.

Figure 5:
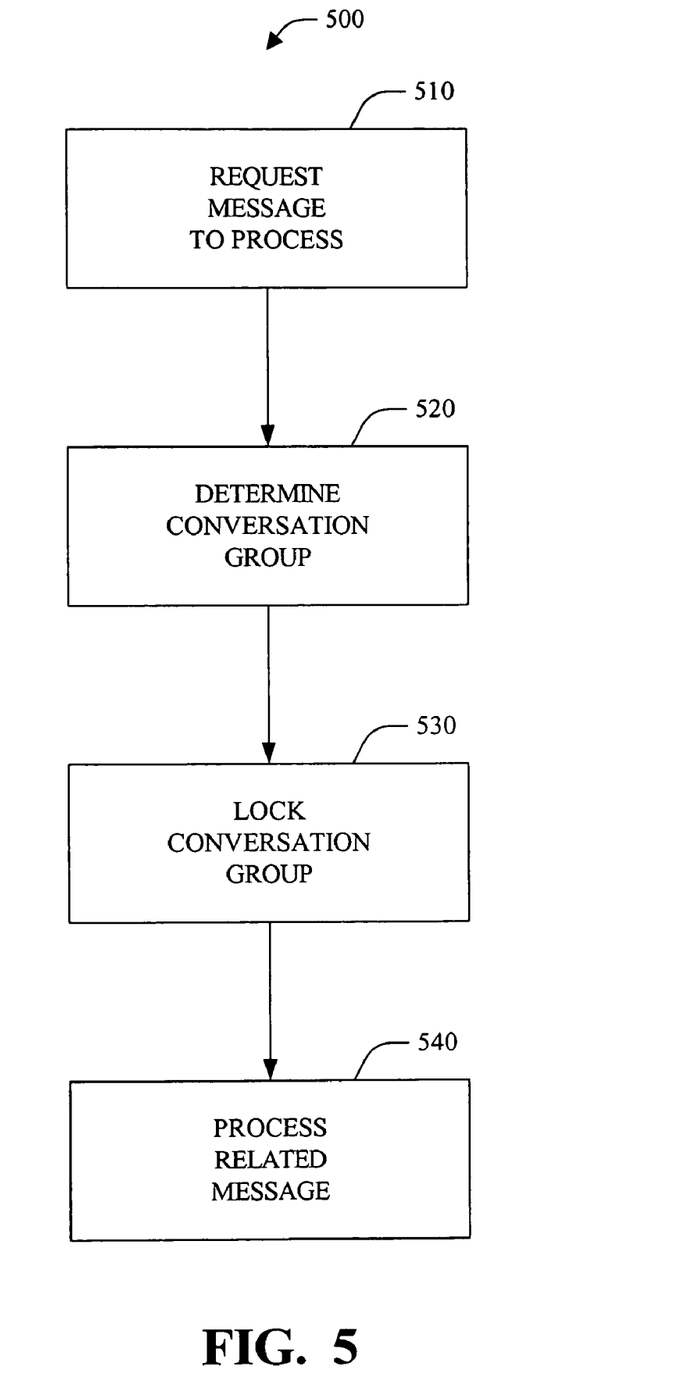
FIG. 5 illustrates an exemplary methodology that facilitates message processing via conversation group locking.
Figure 6:
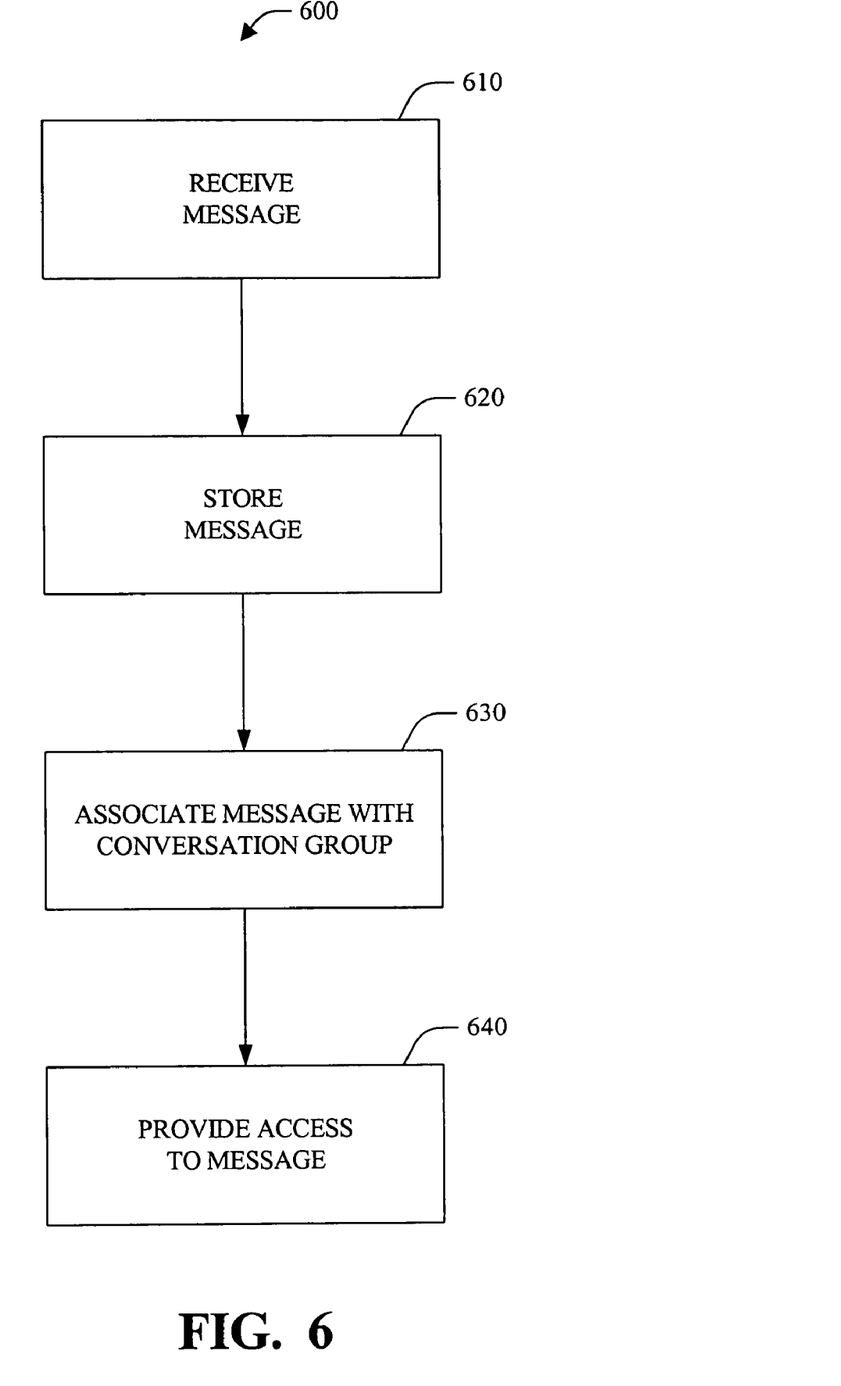
FIG. 6 illustrates an exemplary methodology that facilitates conversation group locking.
Figure 7:
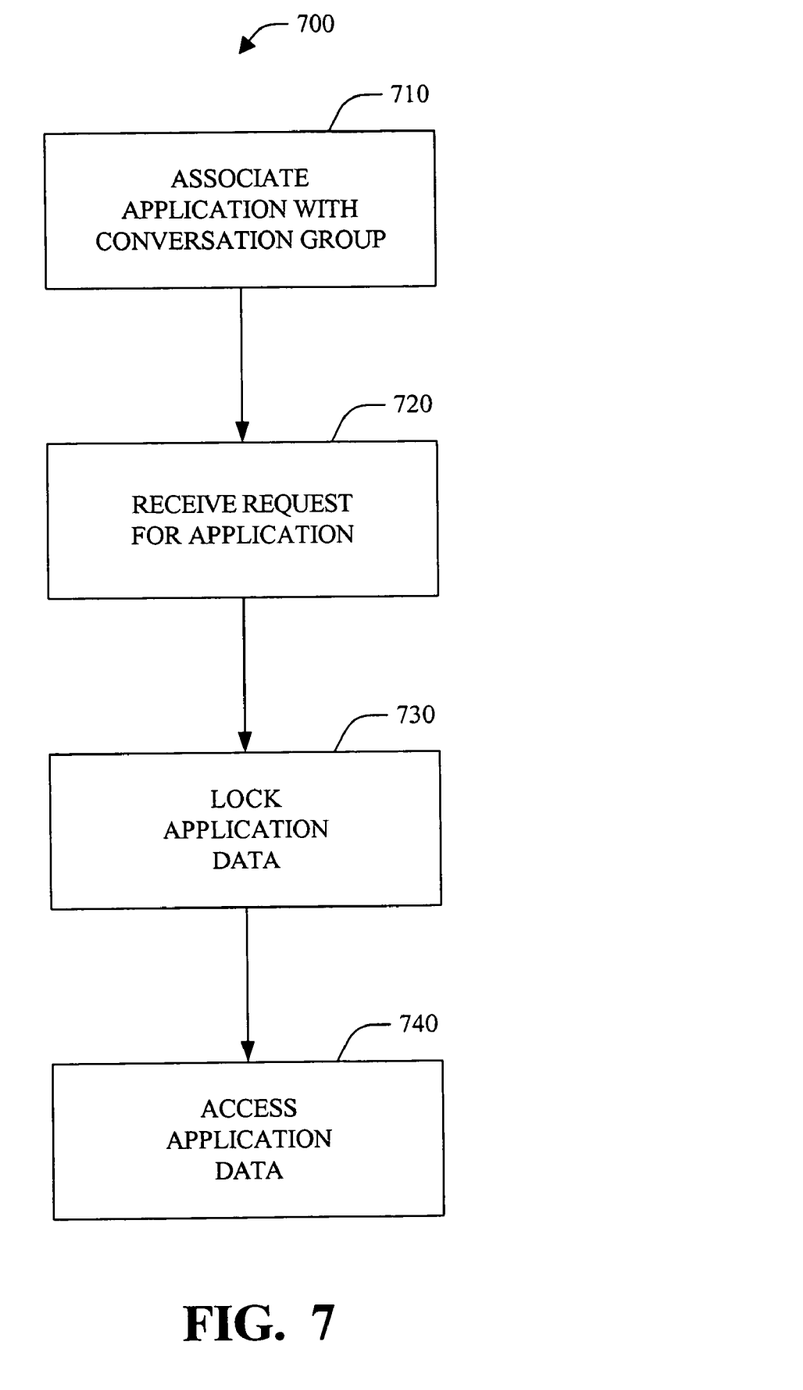
FIG. 7 illustrates an exemplary methodology that employs conversation group locking to facilitate serial access to application data.

FIGS. 5-7 illustrate exemplary methodologies for employing conversation group locking to provide exclusive serial access to data. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Proceeding to FIG. 5, an exemplary methodology 500 that facilitates message processing via conversation locking is illustrated. At reference numeral 510, a reader requests one or more messages to process. Such a request can include information such as one or more messages and/or conversation group identifiers and/or descriptors.

At 520, this information can be utilized to locate related messages and/or associate the requested message with a conversation group. If the request does not include such information, other characteristics of the message, for example, its content, can be utilized to locate related message(s) and/or locate or generate an associated conversation group. In another aspect of the present invention, the first unlocked conversation group found can be locked and utilized. If the request includes a message identifier, this identifier can be utilized to locate related messages and/or locate or generate an associated conversation group. If the request includes a conversation group identifier, the message can be associated with the corresponding conversation group and/or a conversation group can be generated if the identifier does not correspond to any existing conversation groups.

At reference numeral 530, the conversation group identifier can be utilized to lock the conversation group. The lock provides the requesting reader with access to the related messages. In addition, the lock prevents other readers from accessing the locked messages, but does not prevent other readers from locking another unlocked conversation group and processing related messages therein. The foregoing enables concurrent multiple reader access while mitigating, inter alia, transaction "deadlock," roll back and/or failure. It is to be appreciated that related dialogs can open while a conversation group is locked and that related messages can arrive while messages are processed. Such messages can be seamlessly associated with the locked conversation group and accessed by the reader.

At 540, the related messages in the locked conversation group and any related messages that subsequently arrive can be serially processed by the reader. It is to be appreciated that the reader can process all or a subset of the related messages and release the lock. When the lock is released and messages remain, the same or a different reader can request the lock and process any remaining messages or subset thereof.

FIG. 6 illustrates a methodology 600 that facilitates conversation group locking. At reference numeral 610, a message is received for processing. This message can include information such as message identifiers that can be utilized to associate the message with related messages and/or a conversation group. In addition, this information can be replaced or generated when it is absent from the message.

At reference numeral 620, the message can be stored in a messaging queue in an in-order manner. If the message is delivered in-order, the messages can be stored as it arrives, and when the message is delivered out-of-order, an ordering technique can be utilized to facilitate storing it in-order. Such technique can include temporarily storing the out-of-order message until it becomes in-order. The message can then be stored in-order. In another aspect of the present invention, the out-of-order message can be discarded or returned to the sender, wherein the messages can be re-submitted. Re-submissions will be similarly handled until the message is delivered in-order.

At 630, the message can be associated with a conversation group. As noted above, the message can include an identifier that can be utilized to locate the message with related messages and associate the message with a conversation group. At reference numeral 640, the conversation group can be locked in response to a reader request to process at least one of the related message or messages from a particular conversation group. The lock provides the requesting reader with access to the related messages, but prevents other readers from accessing the locked messages. In addition, as related messages arrive, the lock allows such messages to be dynamically associated with the conversation group, and accessed and processed by the reader. Other readers can concurrently lock an unlocked conversation group and process related messages associated therewith. The foregoing enables concurrent multiple reader access while mitigating transaction "deadlock," roll back and/or failure, for example.

FIG. 7 illustrates a methodology 700 that employs conversation group locking to facilitate serial access to application data. At reference numeral 710, an application developer can associate an application with a conversation group. In one aspect of the present invention, the developer can employ an API to associate the application with the conversation group by associating an application state and/or data with a conversation group identifier. At reference numeral 720, a user can employ the application. For example, the user application can be launched by essentially any known means. For example, a script can executed, a mouse can be utilized to perform a clicking sequence on an associated icon, and audio can be utilized to trigger a voice-activated mechanism.

At 730, the application/conversation group association can invoke the locking of the conversation group associated with the conversation group identifier within the application. Typically, the conversation group is automatically locked and locks application data. The requesting user can then access the data while other users are prevented from accessing the application data. Thus, the lock can provide exclusive access to the application data. However, the lock does not prevent the application from generating new data and/or manipulating current data. In addition, message ordering techniques, as described herein, can be employed to ensure data is processed in-order, if desire.

At reference numeral 740, the user can access the locked application data. When finished and/or an event occurs that severs access, the lock can be released. Another user can request the application, or access to the application data, which triggers locking as described above. It is to be appreciated that more than one application can be associated with a conversation group. Thus, a request can result in one or more applications and/or associated data to be locked. The foregoing ensures exclusive data access when multiple applications concurrently execute and read and/or write to each other's data bank.

FIGS. 8-11 illustrate exemplary conversation group topologies. Three topologies are provided for sake of brevity; however, it is to be appreciated that other conversation group topologies comprising various numbers of dialogs with various numbers of messages can be employed in accordance with aspects of the present invention.

Figure 8:
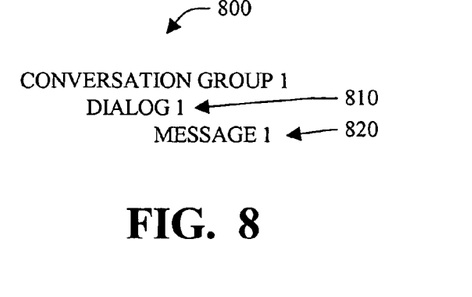
FIGS. 8-11 illustrate exemplary conversation group topologies.
Figure 9:
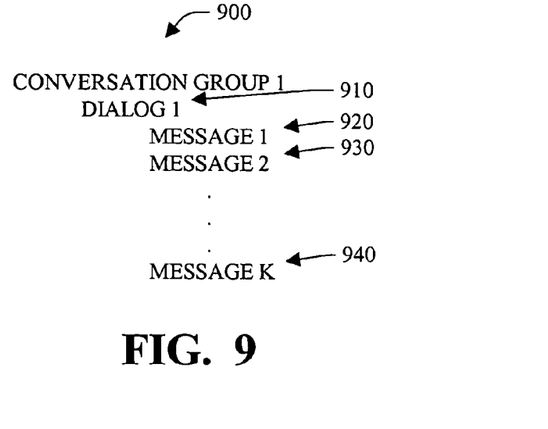

Proceeding to FIG. 8, a conversation group 800 is illustrated. The conversation group topology 800 comprises a first dialog 810 with a first message 820. This example represents a scenario where only one conversation (dialog 810) is associated with the conversation group 800 and the conversation comprises only one message (message 820). FIG. 9 illustrates another conversation group topology 900. The conversation group 900 comprises a first dialog 910 with a first message 920, a second message 930 and a Kth message 940. This example represents a scenario where only one conversation (dialog 910) is associated with the conversation group 900 and the conversation comprises K messages (920, 930, and 940), wherein K is an integer.

Figure 10:
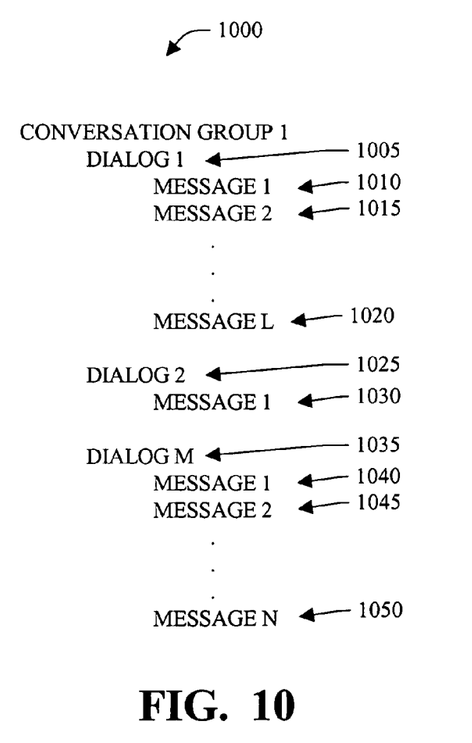
Figure 11:
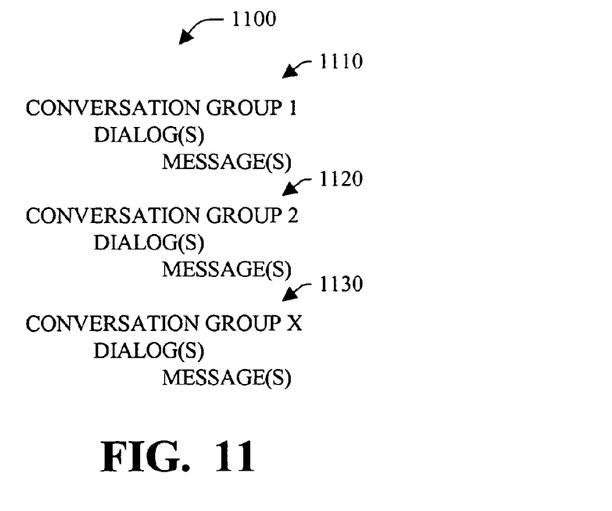

FIG. 10 illustrates a conversation group topology 1000. The conversation group 1000 comprises a first dialog 1005 with a first message 1010, a second message 1015 and an Lth message 1020, a second dialog 1025 with a first message 1030, and an Mth dialog 1035 with a first message 1040, a second message 1045 and an Nth message 1050. This example represents a scenario where the conversation group 1000 comprises M dialogs (dialogs 1005, 1025 and 1035), wherein M is an integer. The dialog 1005 comprises L messages (messages 1010, 1015 and 1020), wherein L is an integer; the dialog 1025 comprises a single message 1030; and the dialog 1035 comprises N messages (dialogs 1040, 1045 and 1050). FIG. 11 illustrates a scenario 1100 with a plurality of conversation groups 1110, 1120 and 1130. It is to be appreciated that related messages are associated with a single conversation group; thus, messages associated with respective conversation groups 1110, 1120 and 1130 are related within a respective conversation group, but not across the conversation groups.

Figure 12:
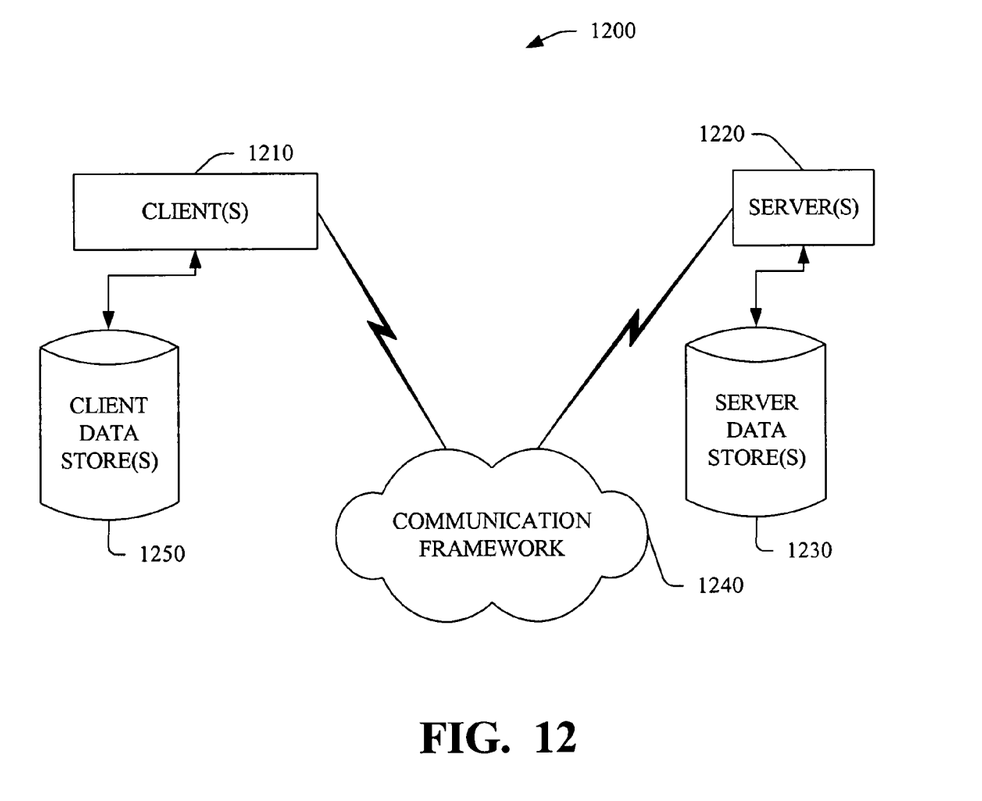
FIG. 12 illustrates an exemplary networking environment, wherein the novel aspects of the present invention can be employed.
Figure 13:
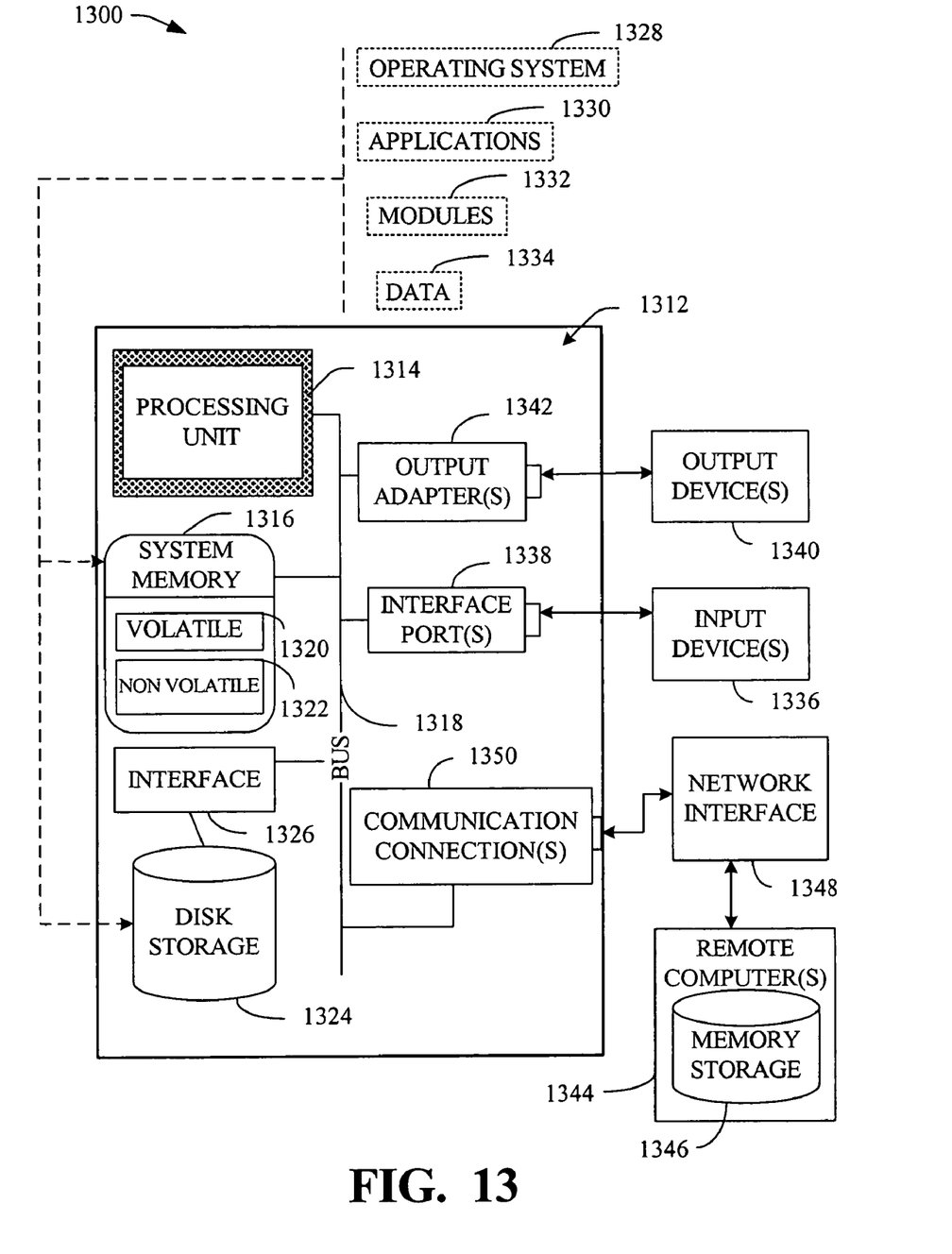
FIG. 13 illustrates an exemplary operating environment, wherein the novel aspects of the present invention can be employed.

In order to provide a context for the various aspects of the invention, FIGS. 12 and 13 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1220. The server(s) 1220 can also be hardware and/or software (e.g., threads, processes, computing devices). The servers 1220 can house threads to perform transformations by employing the present invention, for example. One possible communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the servers 1240.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multi-processor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB).

Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350.

Network interface 1348 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method that facilitates message processing, the method performed within a computer comprising one or more processors and computer system memory, the method comprising:
   requesting one or more messages;
   storing the one or more messages in order;
   determining from information associated with the one or more messages that each of the one or more messages belongs to a conversation group, the conversation group comprising a conversation group topology which comprises a plurality of dialogs, each dialog comprising a plurality of the one or more messages;
   linking the one or more messages by a unique group identifier;
   opening a conversation corresponding to the conversation group;
   locking the conversation group, the lock preventing a disparate requestor from accessing the one or more messages linked by the unique group identifier;
   tracking the conversation corresponding to the conversation group;
   providing exclusive serial access to the messages linked by the unique group identifier such that only one service can process linked messages at any time and such that the messages are processed in order;
   upon a new message arriving, dynamically associating the new message with the locked conversation group such that the new message inherits the lock and the disparate requestor is prevented from accessing the new message;
   while providing exclusive serial access to the messages linked by the unique group identifier, providing concurrent processing of one or more messages not linked by the unique group identifier;
   when a reader has finished processing the linked messages, receiving a notification from the reader to release the lock on the conversation group; and
   releasing the lock.

2. The method of claim 1, further comprising:
   receiving one or more related messages;
   associating the related messages with the conversation group; and
   ordering the related messages to mitigate out-of-order processing.

3. The method of claim 1, further comprising updating the conversation group with incoming related messages.

4. The method of claim 1, further comprising utilizing a conversation group identifier to lock the conversation group.

5. The method of claim 1, further comprising storing the messages in-order.

6. A computer readable storage device storing computer executable instructions which when executed upon one or more computer processors facilitate message processing by causing the processors to perform the method of claim 1.

7. A method that facilitates message processing, the method performed within a computer comprising one or more processors and computer system memory, the method comprising:
   receiving a request for a message;
   determining from information associated with the message that message belongs to a conversation group, the conversation group comprising a conversation group topology which comprises a plurality of dialogs, each dialog comprising a plurality of the one or more messages;
   associating the message and other related messages with a conversation group identified by a unique group identifier;
   opening a conversation corresponding to the conversation group;
   locking the conversation group via the unique group identifier, the lock preventing a disparate requestor from accessing the one or more messages linked by the unique group identifier;
   tracking the conversation corresponding to the conversation group;
   providing exclusive serial access to one or more messages of the conversation group identified by the unique group identifier to the requestor such that the messages are processed in order;
   upon a new message arriving, dynamically associating the new message with the locked conversation group such that the new message inherits the lock and the disparate requestor is prevented from accessing the new message;
   while providing exclusive serial access to the one or more messages of the conversation group, providing concurrent processing of one or more messages not linked by the unique group identifier;
   when the requestor has finished processing the linked messages, receiving a notification from the requestor to release the lock on the conversation group; and
   releasing the lock.

8. The method of claim 7, further comprising utilizing message identifiers to determine whether messages are related.

9. The method of claim 7, further comprising receiving the conversation group identifiers to associate with the conversation group.

10. The method of claim 7, further comprising dynamically updating the conversation group with incoming related messages.

* * * * *